Willis & Stephenson.
Horse Hay Fork.
N° 54050.  Patented Apr. 17, 1866.
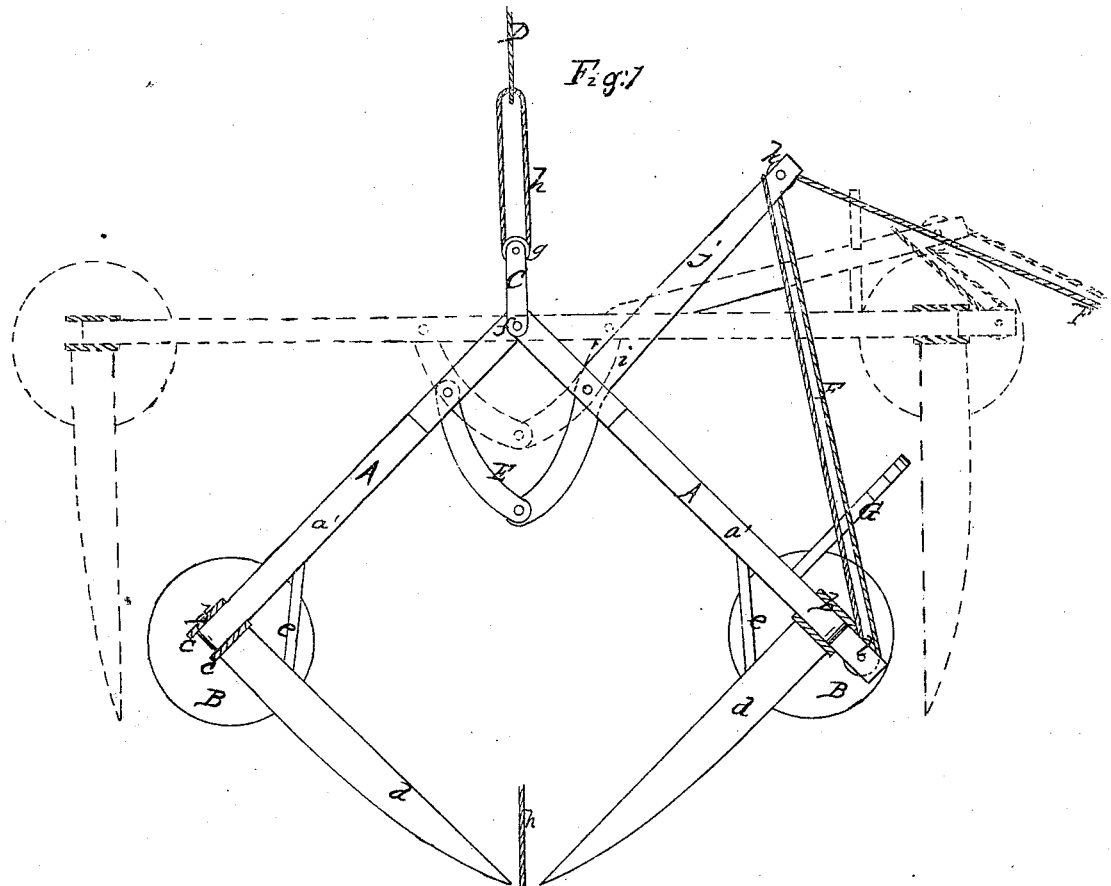
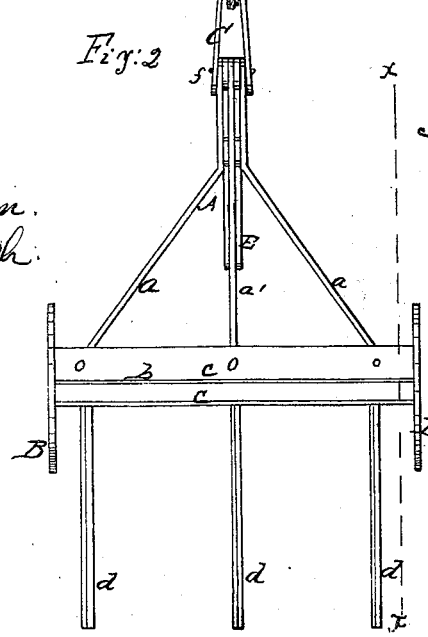
Witnesses
Wm. O'Brien
Theo Tusch
Inventors
C. W. Willis & Stephenson
By Munn & Co
Attys.

UNITED STATES PATENT OFFICE.

C. W. WILLIS AND A. STEPHENSON, OF CAMBRIDGE CITY, INDIANA.

IMPROVEMENT IN HORSE HAY-FORKS.

Specification forming part of Letters Patent No. 54,050, dated April 17, 1866.

*To all whom it may concern:*

Be it known that we, C. W. WILLIS and A. STEPHENSON, of Cambridge City, in the county of Wayne and State of Indiana, have invented a new and Improved Horse Hay-Fork; and we do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\,x$, Fig. 2; Fig. 2, an end view of the same.

Similar letters of reference indicate corresponding parts.

This invention relates to a new and improved horse hay-fork designed for hoisting hay and mowing or storing the same away in barns; and it consists in a novel construction and arrangement of the wheels upon the fork-heads, to enable them to clear beams, &c., with which they may come in contact in the act of hoisting.

A A represent what may be termed "frames," composed each of three bars, $a\,a\,a'$, connected together at their upper parts with the outer bars, $a\,a$, spread apart and out from the central one, $a'$, as shown clearly in Fig 2; and the fork-heads $b$ are secured to the lower ends of the bars $a\,a\,a'$. These heads may be constructed each of two bars, $c\,c$, the teeth $d$ being secured to the heads in any proper manner, and each tooth braced from the bars $a\,a\,a'$ by a rod, $e$. The teeth $d$ project from the heads toward each other, as shown clearly in Fig. 1. At the ends of each fork-head there is a wheel, B.

The upper ends of the two frames A A are connected by a pivot-bolt, $f$, and this bolt attaches a strap, C, to the frames, in the outer end of which there is a pulley, $g$, around which a loop, $h$, passes, having the hoisting-rope D attached.

The two frames A A, near their upper ends, are connected by a toggle, E, one of the arms, $i$, of which is prolonged to form a lever, $j$, having a pulley, $k$, at its outer end, over which a rope, F, passes, said rope extending down and passing around a pulley, $l$, at the lower end of the central bar, $a'$, of one of the frames A, and then, passing upward, is attached to the end of $j$.

From the above description it will be seen that when the forks are loaded and the device is being hoisted, the weight of the load will have a tendency to keep the forks in contact or toward each other, so that the load may be retained; and at any time when it is desired to drop or discharge the load the rope F is pulled and the toggle E thereby operated, so as to spread or throw apart the frames A A, as shown in red in Fig. 1, the lever $j$, when the frames A A are thus spread apart, being retained by a catch, G, attached to the bar $a'$, below it. The forks, therefore, will descend in an open position, ready for being entered into the hay below for a succeeding load.

The wheels B admit of the device clearing beams or other fixtures with which it may come in contact while being raised or lowered.

The brace-rods $e$ greatly strengthen the teeth, and the toggle E and lever $j$, arranged as shown and described, form a very simple and convenient device for discharging the load.

We would remark that the usual hoisting-tackle is employed in elevating and lowering the device.

We do not claim, broadly, the employment or use of two forks hung or arranged in such a manner that they may be moved toward and from each other, for such device has been previously used; but We do claim as new and desire to secure by Letters Patent—

The wheels B, applied to the fork-heads, substantially as and for the purpose set forth.

C. W. WILLIS.
A. STEPHENSON.

Witnesses:
WILLIAM B. REED,
MILES COPELAND.